3,094,502
PROCESS FOR PREPARING FILAMENTS FROM ACRYLONITRILE POLYMER-CONTAINING COMPOSITIONS
John Farago, Wilmington, Del., assignor to E. I. du Pont de Nemours and Company, Wilmington, Del., a corporation of Delaware
No Drawing. Filed Dec. 2, 1959, Ser. No. 856,668
5 Claims. (Cl. 260—30.8)

This invention relates to a novel process for the production of shaped acrylonitrile polymers and articles therefrom.

The utility of shaped articles of acrylonitrile polymers (i.e., polymers containing 80% or more acrylonitrile) is well known. Conventionally, these are made by dry- or wet-spinning and casting techniques. The high molecular weight polymers necessary for the preparation of shaped articles having outstanding physical properties can be used in solution concentrations up to about 22% in dry- and wet-spinning operations. In the case of filament preparation, the spinning speeds are limited by the rate of evaporation of the solvents in dry-spinning and by the rate of coagulation of the polymer in a wet-spinning bath.

Many condensation polymers can be shaped into articles such as filaments, for example, at much higher rates of speed by means of melt-casting or melt-spinning techniques. The formation of shaped articles from polyacrylonitrile melts is extremely difficult because acrylonitrile polymers cannot be melted without decomposition. The prior art has attempted to extrude plasticized melts of acrylonitrile polymers by intimately mixing powdered dry polymer with a plasticizing agent, melting the mixture and extruding the plasticized polymer. Although such processeses are very useful, they have disadvantages in some applications because of the difficulty of preparing homogeneous mixtures of the polymer and plasticizer without excessive overheating and discoloration of the polymer. Also, any inhomogenities in the mixture leads to an excessive melt viscosity and to the development of excessive pressure in the extruding equipment. Usually it is attempted to correct this defect by use of a higher temperature, but this results in an even more discolored product. The long harsh mixing conditions required for the less soluble polymers causes degradation of the polymer and a lowering of the physical properties of the shaped articles.

It is an object of this invention to provide an improved process for the production of plasticized mixtures of acrylonitrile polymers and for the melt-spinning of shaped articles therefrom. A further object is to provide a homogeneous mixture of acrylonitrile polymer and a specific plasticizer from which shaped articles of excellent color and uniformity can be prepared.

These objects are accomplished according to this invention by intimately admixing from about 40 to about 80% by weight of an acrylonitrile-containing monomeric material with from about 60 to about 20% by weight of a plasticizer selected from the group consisting of dimethyl sulfoxide, succinonitrile, and a dimethyl sulfoxide-dimethyl sulfone mixture containing at least about 50% of the sulfoxide component; heating the mixture to a temperature between about 50° and about 130° C. in the presence of a vinyl monomer polymerization catalyst whereby the monomeric material polymerizes to an extent of at least about 60% up to about 100% to provide a plasticized mixture containing between about 40 and about 80% of the polymerized monomeric material; removing any excess monomeric material and extruding a melt of the plasticized mixture at a temperature between about 120° and about 180° C., preferably between about 130° and about 150° C., into shaped articles, such as filaments and films. These articles are then set by quenching and the plasticizer is extracted. When filaments have been formed, they are then drawn.

By blending the monomeric material and plasticizer and then polymerizing the monomeric component a plasticized homogeneous mixture of the polymer is obtained which can be melt-spun into uniform filaments of excellent color and strength characteristics.

By the expression "an acrylonitrile-containing monomeric material" is meant acrylonitrile itself or a mixture of monoethylenically unsaturated monomeric materials containing at least 80% acrylonitrile plus other monomers copolymerizable therewith, such as ethylenically unsaturated sulfonic acids as methallyl sulfonic acids and others as disclosed in U.S. Patents 2,527,300 and 2,601,256 and other monomers as disclosed in Jacobson U.S. 2,436,926 and in Arnold U.S. 2,456,360.

By the expression "vinyl monomer polymerization catalyst" is meant the well known free radical catalysts conventionally used in vinyl monomer polymerization processes. In this class, there are included organic azo compounds as disclosed in U.S. Patent 2,471,959 wherein the azo, —N=N—, group is acyclic and bonded from both of the nitrogens to carbons which are aliphatic in nature and at least one of which carbons is tertiary; diacyl or diaryl peroxides, such as benzoyl peroxide, t-butyl perbenzoate, cyclohexanone peroxide, and others. They may be thermally decomposed or a redox system may be used, such as a peroxide with $SO_2$ and an oxidizable heavy metal iron, such as $Fe^{++}$, or an N,N'-dialkyl aniline. Salts of perdisulfuric acid are also useful in a redox system. The catalyst may be employed in a conventional manner and in an amount as will be apparent to those skilled in the art. Generally, from 0.1 to about 1% by weight of monomer is preferred.

The extruded melt must be substantially free of the volatile monomer. This can be accomplished by removing the residual monomer from a normal polymerization, as by vacuum distillation, or by conducting a post-polymerization at elevated temperatures to attain substantially 100% conversion. Post-polymerization can take place in a continuous system in the last stages, in the melter, or in the spinning head during the extrusion process. Catalysts should be selected for the post-polymerization that will survive the preliminary polymerization conditions (e.g. 50–130° C.).

In its preferred embodiment, the polymerization of this invention is conducted at a rate which provides 90% conversion of the monomer to the polymers per 30 minutes of reaction time, in order that a continuous process of polymerization and melt shaping can be employed.

Shaped articles extruded into room temperature air from a melt of this invention solidify instantly upon coming in contact with the air. It may be desirable for certain applications to quench the filaments with a directed flow of air or even refrigerated air or to use a liquid cooling medium.

The pressures required to extrude melts of polymer will vary with the type of extruder, diameter, and length of extrusion orifices, the number of orifices and type of filter. However, the improved homogeneity of the polymer melts of this invention permits the use of much lower pressures and less expensive extrusion apparatus. Generally, pressures not greater than 2000 p.s.i. and usually less than 1000 p.s.i. are required in the preparation of textile yarns at an extrusion rate of 2 grams/minute per orifice.

The polymer melts contain between about 40 and about 80% polymer, preferably between about 50 and about 65%. When lower concentrations are used, the filaments tend to become tacky and stick together. When higher concentrations are used, excessive extrusion temperatures are required, resulting in discolored yarn.

The process of this invention affords filaments with as-spun deniers from 2 to 100 and higher and total yarn deniers of 80 to 80,000.

Due to the improved uniformity of the plasticized melts of this invention, higher continuous spinning speeds can be used than have been possible heretofore. For example, spinning speeds in the range of 100 to 4000 yards per minute may be used.

Textile fibers prepared in accordance with this invention, in the form of continuous filaments or cut staple, are useful in all manner of textile application, such as in woven or knitted fabrics, carpets and the like.

The expression "inherent viscosity" as used in the examples is defined as:

$$\frac{\ln (n)_r}{c}$$

wherein $c$ is the concentration in grams of the polymer in 100 ml. of the solvent, $(n)_r$ is the relative viscosity computed from the ratio of the flow times in a viscosimeter of polymer solution and of the solvent, and ln is the logarithm to the base $e$. The measurements are made for solutions containing 0.5 gram per 100 ml. of solvent.

The expression "intrinsic viscosity" signifies the value of ln $(n)_r$ at the ordinate axis intercept (i.e., when $c$ equals 0) in a graph of $$\frac{\ln (n)_r}{c}$$

as ordinate with $c$ values as abscissas.

EXAMPLE I

A continuous polymerization vessel comprising a 38" long steam heated tube with an inside diameter of 2 inches, composed of three sections of substantially equal length and containing a closely fitting metering screw driven by a 7½ H.P. motor with suitable coupling and seals, is provided.

A mixture of acrylonitrile monomer (1034 grams), methylacrylate (44 grams), sodium allyl sulfonate (22 grams), dimethyl sulfoxide (900 grams), 1,1'-azo dicyclohexanecarbonitrile (1.08 grams, 0.1% based on total monomer weight) and alpha,alpha'-azodiisobutyronitrile (2.7 grams, 0.25% based on total monomer weight) is placed in a stainless steel container under nitrogen pressure and connected to the above polymerization vessel, which is filled with the monomer mixture and the outlet and inlet valves closed. The first, second, and third sections of the polymerizer are heated by means of steam to 100°, 130° and 150° C., respectively. After 35 minutes, the inlet and outlet (¾ inch) valves are opened, the motor turned on, and the speed of the screw is adjusted to afford a residence time of 30 minutes for the monomer in the vessel. The product is extruded as a transparent, rough surfaced cylinder of ¾ inch in diameter which solidifies to a soft, rubbery transparent gum containing 52% polymer and essentially no monomer, upon striking the air. The polymer present in the gum has an average inherent viscosity of 0.85.

The homogeneous gum is cut into ¼" x ¼" pieces and placed in a hopper over an electrically heated (60 to 120° C.) vertical tube (1¼" diameter and 12" long) containing a loosely fitted auger type revolving screw. The melted gum is fed directly downward at 25–50 p.s.i. to a spinning block containing a gear spinning pump, a 1" thick sand filter and a 2" diameter spinneret containing 20 orifices of 0.012" in diameter. The spinning block is kept at 150–160° C. with electrical heaters. Filaments are extruded at 800 p.s.i. to obtain filaments which solidify immediately upon striking the room temperature air below the spinneret and are wound up at 150 yards per minute (y.p.m.).

The yarn is washed in cold water to remove the dimethyl sulfoxide and is then drawn to 4 times its as-spun length (4.0×draw ratio) in 90–95° C. water.

The resulting filaments of excellent quality are strikingly white, have a tenacity of 3.0 grams per denier (g.p.d.), a break elongation of 45%, and an initial modulus of 30 g.p.d.

A more preferred process is to feed the molten product of the polymerizer directly to a heated reservoir and thence to a spinning pump and spinneret.

EXAMPLE II

A mixture of acrylonitrile (77.5 grams), methyl acrylate (5.04 grams), dimethyl sulfoxide (67.5 grams), alpha, alpha'-azo bis(alpha,gamma-dimethylvaleronitrile) (0.165 gram, 0.2% based on monomer) and 1,1'-azo dicyclohexanecarbonitrile (.083 gram, 0.1% based on total monomer weight) in a nitrogen atmosphere is polymerized in a 500 ml. resin kettle equipped with a stainless steel stirrer and a condenser cooled with "Dry Ice"-acetone. The reaction mixture is maintained at 80° C. by means of a hot water bath. After 30 minutes, the reaction mixture is a clear viscous solution containing 44% polymer (80% conversion) of inherent viscosity 1.10. The kettle is heated under a vacuum of 16 mm. at 80° C. for 5–10 minutes to remove most of the excess monomer. The solution is then poured into glass dishes where it quickly solidifies into a clear rubbery gum.

The gum (containing about 50% polymer and some monomer) from three such polymerizations is cut into pieces about ¼" x ¼" and extruded as filaments using the apparatus (screw melter and extruder) and conditions of Example I.

The 400 denier (5 filaments) as-spun yarn is drawn at 10×draw ratio over a 143° C. hot plate. The drawn yarn (40 denier) has a tenacity of 5.8 g.p.d., an elongation at the break of 10.2%, and an initial modulus of 114. The yarn is strikingly white in color and bubble-free.

The more inactive catalyst 1,1'-azo dicyclohexanecarbonitrile (half life of 23 hours at 80° C.) initiates polymerization of the residual monomer in the screw melter and extruder and thus prevents the formation of bubbles in the filaments. If desired, the monomer can be completely removed by vacuum distillation.

Similar results are obtained when the azo catalysts in the polymerization are replaced with: di-tertiary butyl peroxide, tertiary butyl perbenzoate activated with $SO_2$ and $Fe^{++}$ (effective at 50° C.) or benzoyl peroxide activated with $SO_2$ and $Fe^{++}$.

The use of $SO_2$ gives filaments of the highest white color and, for this reason, is preferred.

A polymer (50 parts), made in an aqueous medium, of the same composition and molecular weight as above, is mixed with dimethyl sulfoxide (50 parts) of a Banbury mixer. When it is attempted to spin the resulting sticky, opaque, non-homogenous mixture in the above apparatus it is noted that it is not spinnable at the same temperature or even at 180° C., at which temperature the yarn would be discolored if spinnable.

EXAMPLE III

A mixture of acrylonitrile (115 grams), methyl acrylate (7.5 grams), sodium allyl sulfonate (2.5 grams), dimethyl sulfone (50 grams), dimethyl sulfoxide (75 grams), alpha,alpha'-azo bis(alpha,gamma-dimethylvaleronitrile) (0.31 grams, 0.25% based on monomer), 1,1'-azo dicyclohexanecarbonitrile (0.12 grams, 0.10% based on monomer), alpha,alpha'-azodiisobutyronitrile (0.12 grams, 0.10% based on monomer) is placed in the apparatus of Example II and heated to 80° C. The dimethyl sulfone dissolves in about 2 minutes and the polymerization starts in about 3 minutes. At the end of 67 minutes of heating at 80° C., the clear fluid reaction product is poured from the flask into glass trays to harden into a clear, rubbery soft gum. The conversion is 68.5% and the polymer has an inherent viscosity of 1.06. The gum is cut into pieces about ¼" by ¼".

The pieces of gum are placed in a hopper located above the entrance to a screw extruder comprising a 12" long (1" inside diameter) stainless steel barrel containing a closely fitting stock screw coupled to a motor with suitable seals which feeds an electrically heated elbow block mounting, a filter pack, and a 5-hole (10 mil diameter) spinneret for the vertical extrusion of filaments. The first section of the extruder is cooled with cold water, the second section is heated to 150° C., the third section and connecting elbow are heated to 170° C. Excellent spinning is obtained with no excessive buildup of pressure (less than 1500 p.s.i.) and the yarn is wound up continuously at 250 y.p.m. The as-spun yarn is washed in cold water to remove the plasticizers and is then drawn 8 × through a tube containing steam at atmospheric pressure. The drawn yarn (1.9 d.p.f.) has a tenacity of 1.9 g.p.d. and is very uniform and of a good white color.

Mixtures of dimethyl sulfoxide and dimethyl sulfone containing at least 50% of the sulfoxide are satisfactory.

EXAMPLE IV

A mixture of acrylonitrile (14 grams), succinonitrile (6 grams) and the catalyst alpha,alpha'-azo bis-(alpha,gamma-dimethylvaleronitrile) (0.028 grams, 0.2% based on monomer) is polymerized at 80° C. in the apparatus of Example III. After 2 minutes, the clear fluid product is poured onto a glass plate whereupon it immediately solidifies to a rubbery, transparent, homogeneous-appearing gum. A conversion of 70% is obtained and the polymer has an inherent viscosity of 3.42. Essentially all of the residual monomer is removed under vacuum. The gum is cut into ¼" particles and spun from a press spinner consisting of an electrically heated tube (170–180° C.) of 1" inside diameter containing a hydraulically driven piston at one end and a sand pack filter and spinneret (5 holes of .010" in diameter) heated to 170–180° C. at a pressure of less than 1000 p.s.i. and the white filaments wound up at 100 y.p.m.

When the above gum is replaced with composition obtained by mixing polyacrylonitrile (inherent viscosity 1.1) with succinonitrile in a Waring Blendor or a Banbury mixer, no filament can be extruded at 2000 p.s.i. using an orifice 10 mils in diameter or smaller even through the use of a lower molecular weight polymer would make the extrusion much easier.

EXAMPLE V

A mixture of acrylonitrile (11.3 grams), methyl acrylate (0.7 gram) one of the plasticizers shown in Table I (8.0 grams) and the catalyst alpha,alpha'-azo bis-(alpha,gamma-dimethylvaleronitrile) (0.024 gram, 0.2% based on monomer) is polymerized in a 100 ml. Erlenmeyer flask fitted with a condenser and a magnetic stirrer and heated by a water bath to 80° C. The results are given in Table I.

*Table I*

| Item | Plasticizer | Time, Minutes | Conversion, Percent | Inherent Viscosity | Product, Remarks at Room Temperature | Spinning Behavior, Remarks |
|---|---|---|---|---|---|---|
| 1 | Dimethyl sulfoxide [1] | 15 | 49 | 1.45 | Clear, uniform rubbery gun | Excellent. |
| 2 | Dimethyl sulfoxide/dimethyl sulfone 50/50. | 22 | 35 | 1.47 | Clear, uniform soft, rubbery gum. | Do. |
| 3 | Succinonitrile | 12.5 | 45 | 1.2 | Clear, uniform gum | Good. |
| 4 | Dimethylacetamide | 17 | 27 | 0.74 | White, wax | Not spinnable—too weak to wind up. |
| 5 | Dimethylformamide | 15 | Less than 10 |  | Precipitate of polymer | Not spinnable. |
| 6 | Tetramethylene sulfone | 27 | 20 | 1.54 | Thick, waxlike liquid | Poor—maximum spinning speed 100 y.p.m., frequent breaks; yellow color. |
| 7 | Ethylene carbonate | 10 | 26.9 | 1.33 | White soft paste | Poor (spinning speeds less than 30 y.p.m., required); yellow color. |

[1] 43% plasticizer, all others 40%.

In all cases, except when using the dimethyl sulfoxide, succinonitrile or dimethyl sulfoxide-dimethyl sulfone mixtures of this invention, unsatisfactory results are obtained, such as low conversion of polymer or production of low molecular weight polymer.

The results obtained when attempting to spin the products at 1000 p.s.i. and 180° C. (after removal of residual monomer and sufficient plasticizer to give a gum containing about 40% solids) in a simple press spinner are also shown. A spinning temperature of 185° C. was required for items 6 and 7, but still the results are poor.

It has also been noted that the presence of an acid or a base (e.g., an acid modified polymer) in a plasticized melt containing a cyclic ester such as butyrolactone or ethylene carbonate causes degradation of the plasticizer and the formation of bubbles of gas in the melt in pressed films or extruded filaments when temperatures in excess of 140° C. are used.

I claim:
1. In a process for preparing a filamentary article, the steps of
(a) intimately admixing from about 40% to about 80% by weight of a monomeric material consisting of at least 80% acrylonitrile and up to 20% of a copolymerizable monoethylenically unsaturated monomer with from about 60% to about 20% by weight of a plasticizer selected from the group consisting of (1) dimethylsulfoxide, (2) succinonitrile, (3) a mixture of dimethylsulfoxide and dimethylsulfone containing at least about 50% by volume of dimethylsulfoxide,
(b) adding a vinyl monomer polymerization catalyst to the mixture of monomeric material and plasticizer in an amount between about 0.1% and about 1.0% by weight of said monomeric material,
(c) heating the resulting mixture to between about 50° C. and about 130° C. to polymerize said monomeric material to an extent of at least about 60% to provide a plasticized mixture containing from about 40% to about 80% by weight of polymerized monomeric mixture,

(d) substantially removing residual volatile monomer, and (e) melt-extruding the plasticized material at a temperature between about 120° C. and about 180° C. to form a filamentary article.

2. The novel process of claim 1 wherein the plasticizer consists of dimethyl sulfoxide and the catalyst consists of 1,1'-azo dicyclohexanecarbonitrile.

3. The novel process of claim 1 wherein the conversion rate of the monomer to the polymer is at least about 90% per 30 minutes of reaction.

4. The novel process of claim 1 wherein the extrusion temperature is between about 130° and about 150° C.

5. The novel process of claim 1 wherein the mixture is extruded into the form of filaments.

References Cited in the file of this patent

UNITED STATES PATENTS

| | | |
|---|---|---|
| 2,404,717 | Houtz | July 23, 1946 |
| 2,456,360 | Arnold | Dec. 14, 1948 |
| 2,776,946 | Lytton et al. | Jan. 8, 1957 |
| 2,779,746 | Heisenberg et al. | July 29, 1957 |
| 2,858,288 | Ehlers et al. | Oct. 28, 1958 |